United States Patent [19]
Ejiri

[11] Patent Number: 6,163,800
[45] Date of Patent: *Dec. 19, 2000

[54] DATA COMMUNICATION APPARATUS AND METHOD

[75] Inventor: Seishi Ejiri, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/733,493

[22] Filed: Oct. 18, 1996

[30] Foreign Application Priority Data

Oct. 19, 1995 [JP] Japan .................................. 7-271261

[51] Int. Cl.⁷ .......................... G06F 15/16; G06F 15/17
[52] U.S. Cl. ........................ 709/206; 709/245; 358/407
[58] Field of Search .................................... 358/402, 405, 358/407, 434, 436, 438, 439, 440, 444; 379/100.06, 100.08, 100.09, 100.05, 100.12; 395/200.36, 200.57, 200.67, 200.68, 840, 114, 200.73, 200.74, 200.65

[56] References Cited

U.S. PATENT DOCUMENTS

| | | | |
|---|---|---|---|
| 4,818,984 | 4/1989 | Chang et al. ....................... | 340/825.54 |
| 4,941,170 | 7/1990 | Herbst ...................................... | 379/100 |
| 5,057,935 | 10/1991 | Williams ................................. | 358/402 |
| 5,212,806 | 5/1993 | Natarajan ................................ | 455/525 |
| 5,404,231 | 4/1995 | Bloomfield et al. ................... | 358/400 |
| 5,454,030 | 9/1995 | De Oliveira et al. .................. | 379/100 |
| 5,521,631 | 5/1996 | Budow et al. ............................... | 348/7 |
| 5,555,100 | 9/1996 | Bloomfield et al. ................... | 358/402 |
| 5,559,611 | 9/1996 | Bloomfield et al. ................... | 358/407 |
| 5,646,982 | 7/1997 | Hogan et al. ........................... | 379/207 |
| 5,663,715 | 9/1997 | Godoroia ................................ | 370/350 |
| 5,675,507 | 10/1997 | Bobo, II ................................. | 709/206 |
| 5,684,862 | 11/1997 | Finnigan ................................. | 379/220 |
| 5,689,805 | 11/1997 | Ayerst et al. ............................ | 370/312 |
| 5,740,230 | 4/1998 | Vaudreuil ................................. | 379/88 |
| 5,748,104 | 5/1998 | Argyroudis et al. .................... | 370/320 |
| 5,757,669 | 5/1998 | Christie et al. ......................... | 709/205 |
| 5,873,068 | 2/1999 | Beaumont et al. ....................... | 705/14 |

FOREIGN PATENT DOCUMENTS

| | | |
|---|---|---|
| 615 377 | 9/1994 | European Pat. Off. . |
| 2 240 691 | 8/1991 | United Kingdom . |

OTHER PUBLICATIONS

Gronert, E., "Fax Servers Get a Fix on Incoming Messages", *Data Communications* 23:55–56C (Jul. 1994).

Woods, B.J., et al., "Development and future trends of the personal facsimile market in Japan", *BT Technology Journal* 12:98–105 (Jan. 1994).

European Search Report in corresponding foreign application EP 96 30 7566 which cites the references diclosed in this Form PTO–1449.

*Primary Examiner*—Mark H. Rinehart
*Assistant Examiner*—Marc D. Thompson
*Attorney, Agent, or Firm*—Morgan & Finnegan, LLP

[57] ABSTRACT

The present invention provides a data processing apparatus which performs a data process via a LAN and a communication line other than the LAN comprises reception means for receiving data from a transmission side via the communication line notification means for notifying that the reception means received the data, to a plurality of receivers on the LAN transmission means for transmitting information representing a notification result by the notification means, to the transmission side timer means for performing a time count and control means for causing the transmission means to start the transmission, when it is judged by the timer means that a predetermined period of time is elapsed, so that it can be easily notified to the transmission side whether or not the data reception was notified to terminals on the LAN.

5 Claims, 11 Drawing Sheets

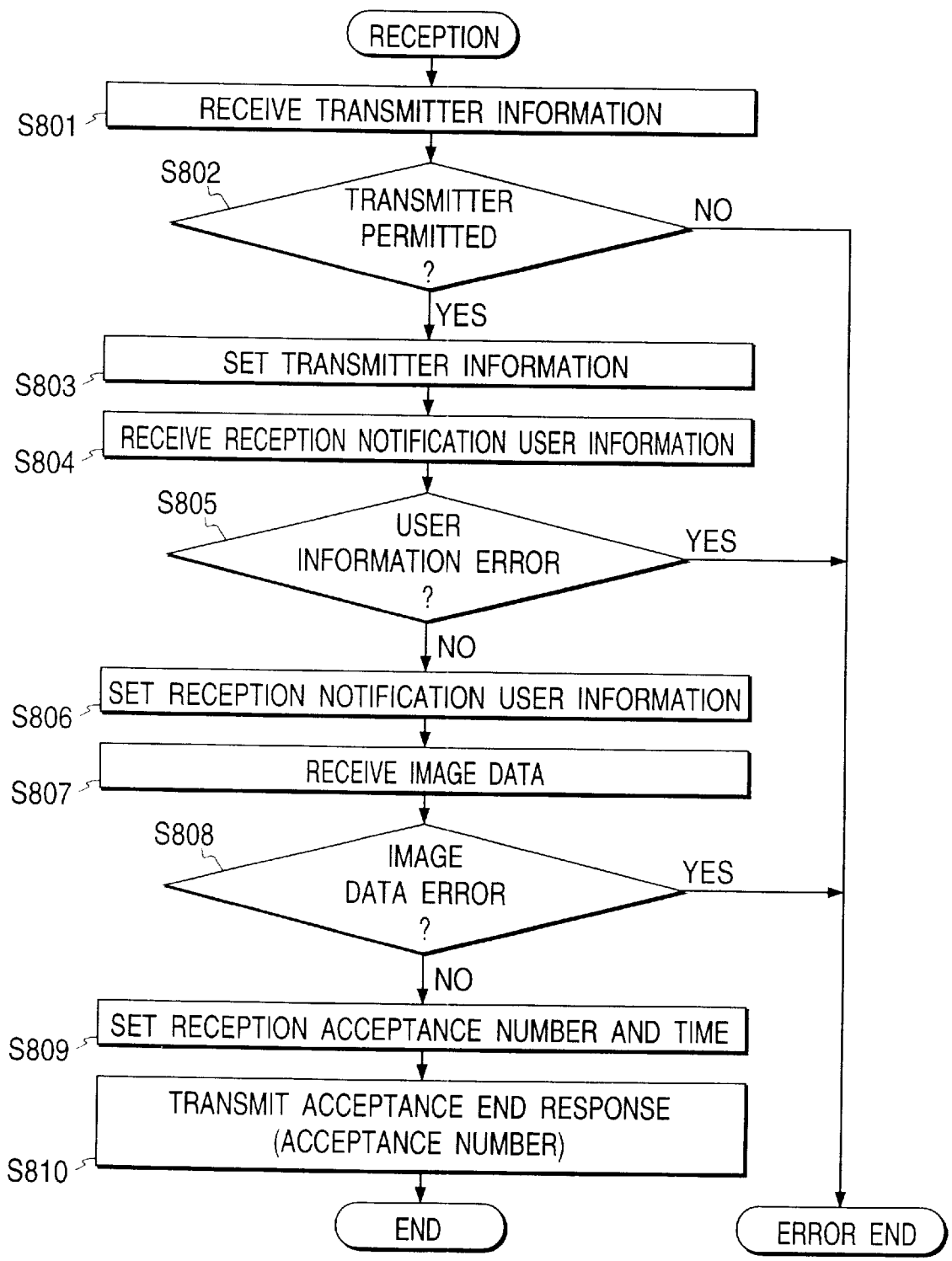

DATA COMMUNICATION APPARATUS AND METHOD

BACKGROUND OF THE INVENTION

1. Field of the Invention

The present invention relates to data communication apparatus and method, and more particularly to data communication apparatus and method which are provided between a local area network (LAN) and a communication line other than the LAN.

2. Related Background Art

In recent years, there is proposed an apparatus of this type in which, e.g., a facsimile machine (facsimile server) is connected to a local area network (LAN) and receives data via a telephone line, and it is notified to a receiver that the data was received. According to such the apparatus, a transmission side can transmit the data via the telephone line after designating the receiver on a communication partner's LAN, whereby the data can be surely transmitted to a desired receiver on the partner's LAN.

However, an operator of the transmission side cannot know whether or not a facsimile machine (facsimile server) of a reception side could normally notify the data reception to the receiver on the LAN. Therefore, there is a problem that it is needed a cumbersomeness that the operator of the transmission side has to confirm such a notification by using a telephone or the like. As a result, if a plurality of receivers have been designated, an operator's load of the transmission side seriously increases.

SUMMARY OF THE INVENTION

An object of the present invention is to provide data communication apparatus and method for solving the above problem.

Another object of the present invention is to provide data communication apparatus and method in which it can be easily confirmed whether or not a receiver who should receive data transmitted by a transmission side actually received the transmitted data.

Another object of the present invention is to provide data communication apparatus and method in which a transmission side can know whether or not a receiver received data in a manner desired by either the transmission side or a reception side.

Another object of the present invention is to provide data communication apparatus and method in which a transmission side can effectively know whether or not a receiver received data.

The above and other objects of the present invention will be apparent from the following detailed description in conjunction with the attached drawings.

BRIEF DESCRIPTION OF THE DRAWINGS

FIG. 8 is a flow chart illustrating a process flow concerning a data reception by the facsimile apparatus of the reception side;

DETAILED DESCRIPTION OF THE PREFERRED EMBODIMENT

Hereinafter, the embodiment of the present invention will be explained in detail with reference to the accompanying drawings.

Figure 1:
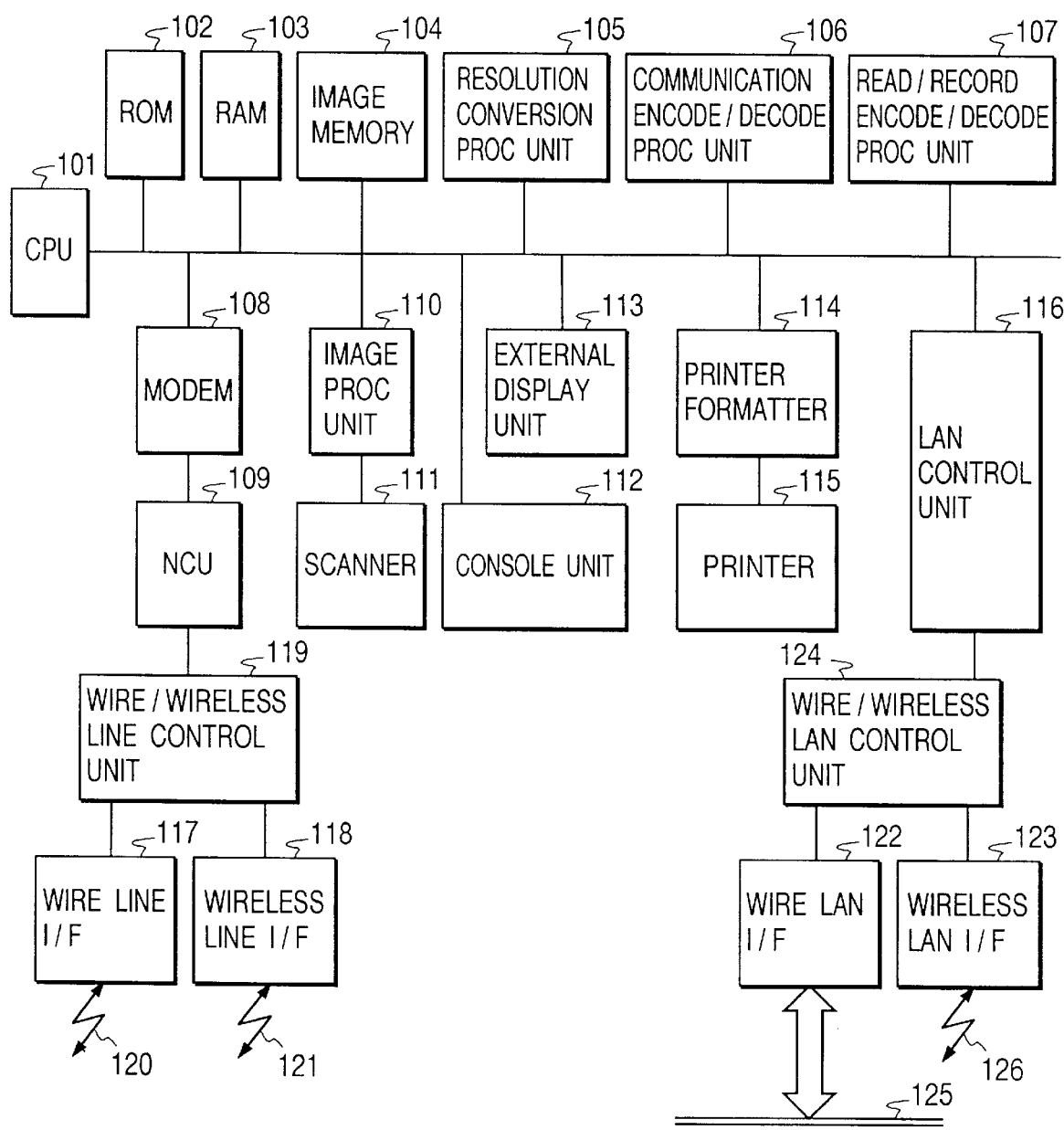
FIG. 1 is a block diagram illustrating structure of a facsimile apparatus according to an embodiment of the present invention.

FIG. 1 is a block diagram showing structure of a facsimile apparatus according to the embodiment of the present invention. In FIG. 1, a CPU 101 is a system control unit which controls the facsimile apparatus as a whole. Further, the CPU 101 performs time counting.

A ROM 102 is a memory which stores a control program used by the CPU 101 to control an operation of each unit, and other fixed data.

A RAM 103 composed of an SRAM and the like is a random access memory which stores a program control parameter and the like. Also, the RAM 103 stores a setting value registered by an operator, management data of the facsimile apparatus and the like, and is used as buffers for various works.

An image memory 104 composed of a DRAM and the like is a memory which stores input image data.

A resolution conversion process unit 105 performs resolution conversion controlling of, e.g., a raster data millimeter-inch conversion or the like.

A communication encode/decode process unit 106 performs encoding for a communication, in a case where an encode system at reading and recording time is different from an encode system at communicating time.

A read/record encode/decode process unit 107 performs encode and decode processes of the image data at the reading and recording time.

A modem 108 performs modulation and demodulation processes of facsimile transmission and reception signals. A network control unit (NCU) 109 has a function for transmitting a selection signal (dial pulse or tone dialer) to a wire communication line 120 via a wire line interface 117, or to a wireless communication line 121 via a wireless line interface 118. The NCU also performs an automatic reception operation responsive to detecting of a call sound. A wire/wireless line control unit 119 controls the wire line interface 117 and the wireless line interface 118.

A scanner 111 is composed of a CS image sensor, an original feeder mechanism and the like. The scanner 111 optically reads an original and then converts it into electrical image data.

An image process unit 110 performs a correction process for the image data read by the scanner 111 to output highly accurate image data.

A console unit 112 which is composed of a keyboard and the like is used by the operator to perform various input operations.

An external display unit 113 which is composed of a liquid crystal display (LCD), a light emitting diode (LED) and the like is used to display and notify various information to a user.

A printer formatter 114 analyzes code data such as a printer description language or the like in case of printing file data from a work station and the like, and then converts the analyzed data into image data developed to a bit map.

A printer 115 is a device which prints out a received image or the file data onto a recording paper, as a visible image.

A wire LAN interface 122 is an interface for connecting the facsimile apparatus to a wire LAN 125, and a wireless LAN interface 123 is an interface for connecting the facsimile apparatus to a wireless LAN 126. A wire/wireless LAN control unit 124 controls data inputting and outputting of the wire LAN interface 122 and the wireless LAN interface 123.

A LAN control unit 116 performs a data process or the like to transmit/receive the data to/from various devices on the wire LAN 125 or the wireless LAN 126.

Figure 2:
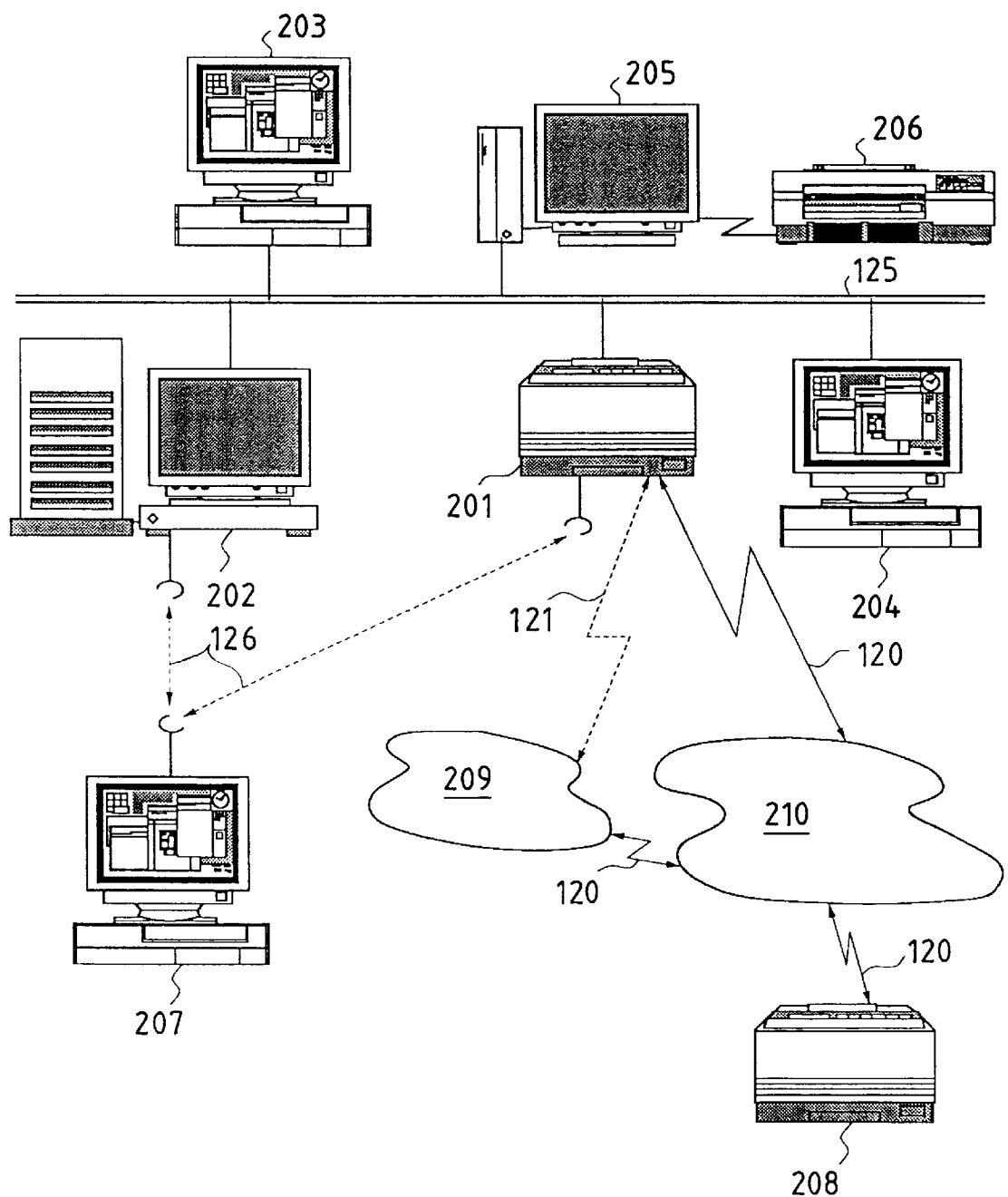
FIG. 2 is a view illustrating a connection arrangement in a case where the facsimile apparatus illustrated in FIG. 1 is connected to a network.

FIG. 2 is a schematic view showing a connection arrangement in a case where the facsimile apparatus shown in FIG. 1 is connected to a local area network (LAN).

In FIG. 2, reference numeral 201 denotes the facsimile apparatus shown in FIG. 1 which can be directly connected to the wire LAN 125 and the wireless LAN 126. Further, the facsimile apparatus 201 can transmit various data to other apparatuses or devices via the wire LAN 125 and the wireless LAN 126.

Reference numeral 202 denotes a server machine which is used for managing the LAN (wire LAN 125 and wireless LAN 126) to which the facsimile apparatus 201 is connected. The server machine 202 manages or controls users of the LAN and the file data on the LAN.

Each of reference numerals 203 and 204 denotes a client machine or a client (information process terminal) which is connected to the wire LAN 125. The clients 203 and 204 can produce and edit the various image data, e.g., document data and the like, in accordance with installed application programs. Then, the clients 203 and 204 transfer the image data to the facsimile apparatus 201 and request the apparatus 201 to perform facsimile transmitting thereof, or transfer the image data to a printer server 205 and requests the server 205 to perform printing thereof by using a printer 206. Also, the clients 203 and 204 can receive the data which was received by the facsimile apparatus 201. In the present embodiment, these two client machines 203 and 204 are shown, but the present invention is not limited thereto. That is, a number of client machines can be connected to the LAN.

Reference numeral 205 denotes the printer server which accepts a plurality of print requests from the client machines, performs cueing and controls such that the image data transmitted from the client machine is output to the printer 206. The printer 206 visibly outputs the accepted image data onto a recording paper.

Reference numeral 207 is the client machine connected to the wireless LAN 126. Also, the client machine 207 can perform the same processes as can be performed by the client machines 203 and 204, by a wireless communication.

Reference numeral 208 is a facsimile apparatus which is used to perform facsimile communicating to the facsimile apparatus 201 via the wire communication line 120 (telephone line).

Reference numeral 209 denotes a wireless station which performs protocol controlling for the wireless communication. The facsimile apparatus 201 performs transmitting/receiving of the data to/from other apparatuses or devices via the wireless line 121 by the wireless communication.

Reference numeral 210 is a line network (PSTN) for the wire communication. The PSTN 210 performs communicating to the wireless station 209 or other apparatuses via the wire communication line 120.

Figure 3:
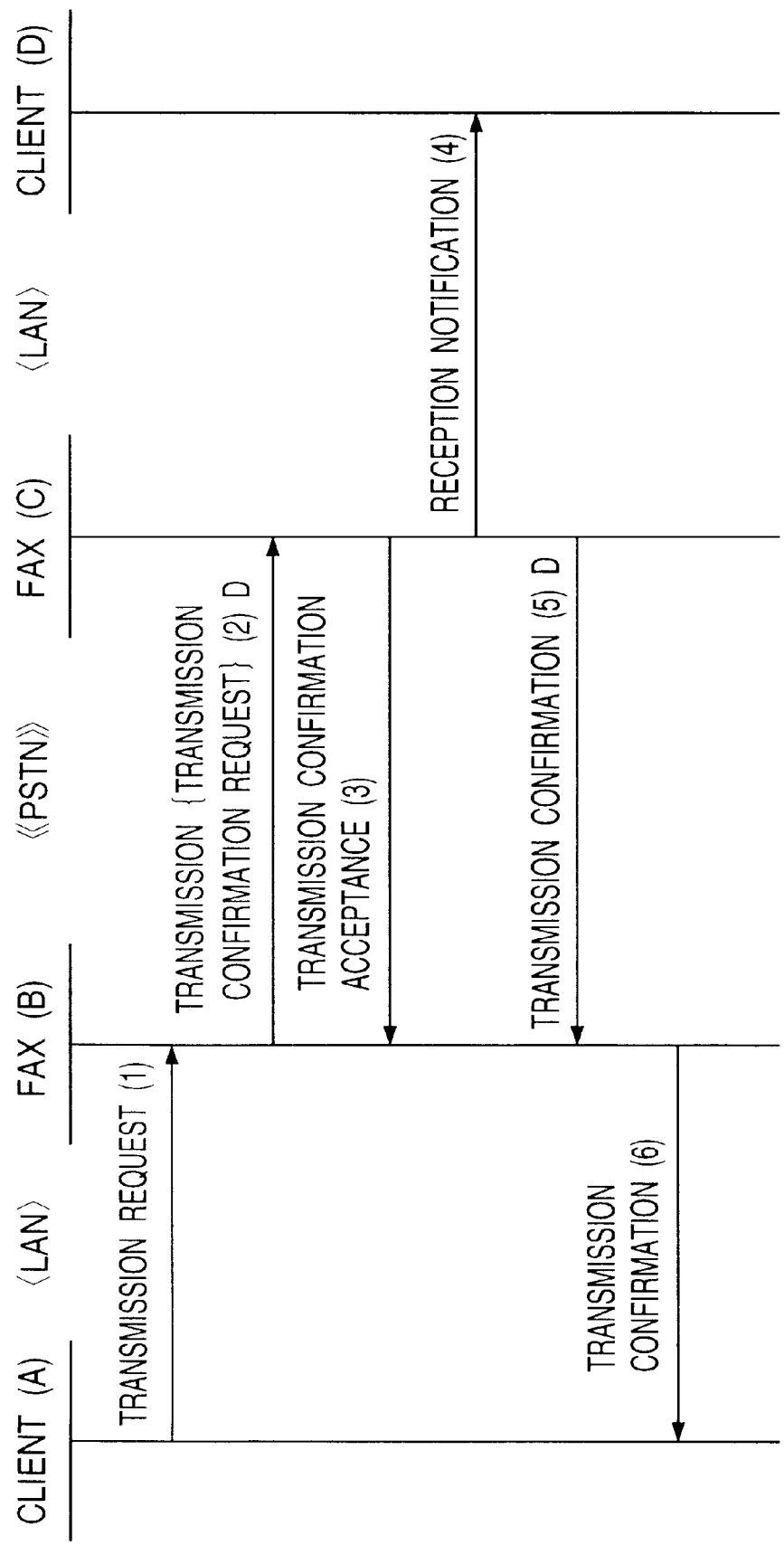
FIG. 3 is a view illustrating a sequence flow in a case where a client on a LAN transmits data to a client on another LAN via a facsimile apparatus.

FIG. 3 is a view showing a sequence flow in a case where the client on the LAN transfers the data to the facsimile apparatus to transmit the data to the client on other LAN via a line network. In the drawing, numerals are appropriately added as a matter of convenience.

The client who requests the facsimile apparatus to transmit the data is set as a client (A), and the facsimile apparatus which accepts such a transmission request and transmits the data via the line network is set as a facsimile apparatus (B) (FAX (B)). Further, the LAN to which the client (A) and the facsimile apparatus (B) are connected is set as a LAN 1. Furthermore, the facsimile apparatus which receives the data transmitted from the facsimile apparatus (B) is set as a facsimile apparatus (C) (FAX (C)), the client who is designated by the client (A) is set as a client (D), and the LAN to which the facsimile apparatus (C) and the client (D) are connected is set as a LAN 2. In this case, each of the facsimile apparatuses (B) and (C) has the same structure as that in the facsimile apparatus 201 shown in FIG. 1.

Initially, the client (A) on the LAN 1 transmits a transmission request (1) to the facsimile apparatus (B), so as to perform the facsimile communication to the client (D) on the LAN 2 via the line network 210 (PSTN). The transmission request (1) transmitted by the client (A) includes information for designating the client (D) from among the plurality of clients, a telephone number of the facsimile apparatus (C) on the LAN 2 to which the client (D) is connected, and information for requesting the facsimile apparatus (C) to return information (transmission confirmation) representing that the facsimile apparatus (C) notified to the client (D) that the facsimile apparatus (C) had received the data for the client (D). There is no need that these information are always transmitted from the client (A). That is, these information may be previously registered in the facsimile apparatus (B).

Then, the facsimile apparatus (B) which received the transmission request (1) generates a call on the basis of the telephone number of the facsimile apparatus (C) connected to the LAN 2 which includes the client (D), so as to transmit the image data to the facsimile apparatus (C). At that time, the facsimile apparatus (B) requests a transmission confirmation (2) for the client (D).

The facsimile apparatus (C) which received the image data and the signal representing the transmission confirmation request returns the signal representing a transmission confirmation acceptance (3) to the facsimile apparatus (B), if the facsimile apparatus (C) can normally receive the image data and is set to permit or authorize to return the transmission confirmation. The line is released after the image data reception terminates. Further, the RAM 103 of the facsimile apparatus (C) stores a telephone number of the facsimile apparatus (B) of the transmission side and the information representing that the transmission was performed from the client (A).

Then, that facsimile apparatus (C) performs a reception notification (4) representing that the data was received, to the client (D) which is the reception destination on the LAN 2. Subsequently, the facsimile apparatus (C) generates a call on the basis of the telephone number of the facsimile apparatus (B), so as to transmit to the facsimile apparatus (B) the signal representing a transmission confirmation (5) for the client (D). At this time, the facsimile apparatus (C) simultaneously transmits the information for designating the client (A).

The facsimile apparatus (B) receives the transmission confirmation and transmits the signal representing a transmission confirmation (6) to the client (A) which is the transmission indication source.

In the above explanation, the transmission confirmation is performed at the time when the facsimile apparatus of the reception side performs the reception notification to the client connected to the LAN. However, the present invention is not limited to such an operation. That is, the transmission confirmation may be performed at the time when transferring of the received image data to the client terminates. In any case, the transmission confirmation represents that the client (i.e., receiver) is in the state capable of surely confirming the contents of the received image data.

Figure 4:
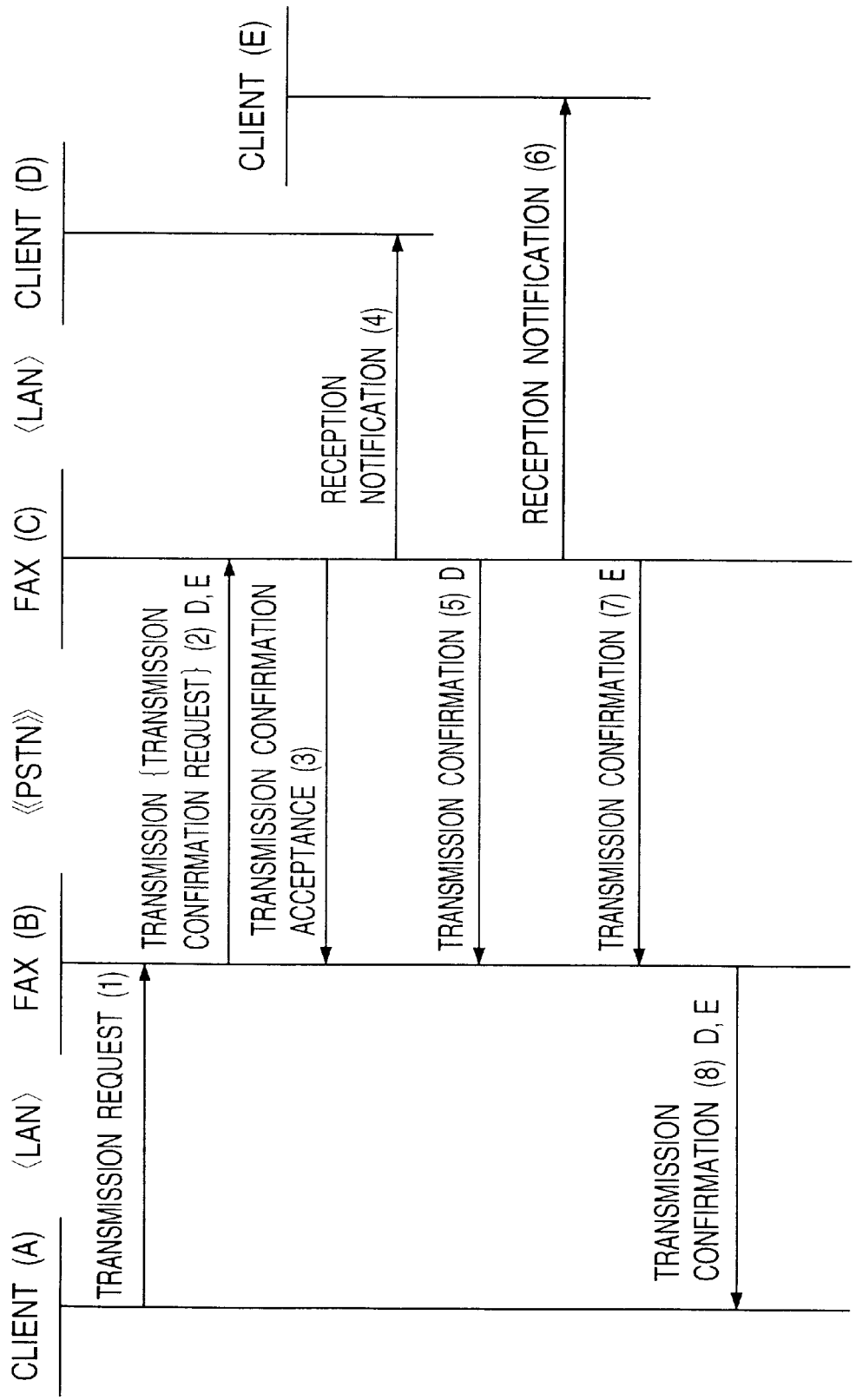
FIG. 4 is a view illustrating a sequence flow in a case where a plurality of clients are designated in the case of FIG. 3.

FIG. 4 is a view showing a sequence flow in a case where the plurality of clients on the LAN 2 are designated. In this case, it will be explained a case where the client (D) and a client (E) on the LAN 2 are designated.

Initially, the client (A) on the LAN 1 transmits the transmission request (1) to the facsimile apparatus (B) for causing the facsimile apparatus (B) to perform the facsimile transmission to the clients (D) and (E) on the LAN 2 via the line network 210 (PSTN).

The facsimile apparatus (B) which received the transmission request (1) then generates a call on the basis of the telephone number of the facsimile apparatus (C) which is connected to the LAN 2 including the clients (D) and (E), and transmits the image data to the facsimile apparatus (C). At this time, the facsimile apparatus (B) simultaneously requests the transmission confirmation (2) for the clients (D) and (E).

If the facsimile apparatus (C) which received the image data and the signal representing the transmission confirmation request (2) can receive the image data normally and is set to permit or authorize to return the transmission confirmation, the facsimile apparatus (C) returns the signal representing the transmission confirmation acceptance (3) to the facsimile apparatus (B), and releases the line after the image data reception terminates. Further, the telephone number of the facsimile apparatus (B) of the transmission side and the information representing that the transmission was performed from the client (A) are stored in the RAM 103 of the facsimile apparatus (C).

Then, the facsimile apparatus (C) performs the reception notification (4) to the client (D) which is one of the reception destination clients on the LAN 2. Subsequently, the facsimile apparatus (C) generates a call on the basis of the telephone number of the facsimile apparatus (B), and transmits to the facsimile apparatus (B) the signal representing the transmission confirmation (5) for the client (D). At this time, the facsimile apparatus (C) simultaneously transmits the information for designating the client (A). After such the transmission terminates normally, the facsimile apparatus (C) releases the line.

Thereafter, the facsimile apparatus (C) performs a reception notification (6) to the client (E) which is the other one of the reception destination clients on the LAN 2. Subsequently, the facsimile apparatus (C) generates a call on the basis of the telephone number of the facsimile apparatus (B), and transmits to the facsimile apparatus (B) the signal representing a transmission confirmation (7) for the client (E) together with the information for designating the client (A). After such the transmission terminates, the facsimile apparatus (C) releases the line.

After then, the facsimile apparatus (B) receives the above transmission confirmations (5) and (7), and transmits the signal representing a transmission confirmation (8) to the client (A) which is the transmission indication source.

According to such a method described above, the transmission confirmations concerning the plurality of reception destination clients can be surely received. Further, it can be prevented a long-period communication busy state which is caused by maintaining line capturing. Furthermore, the transmission confirmation concerning the client to which the reception notification is terminated can be quickly received and obtained.

Figure 5:
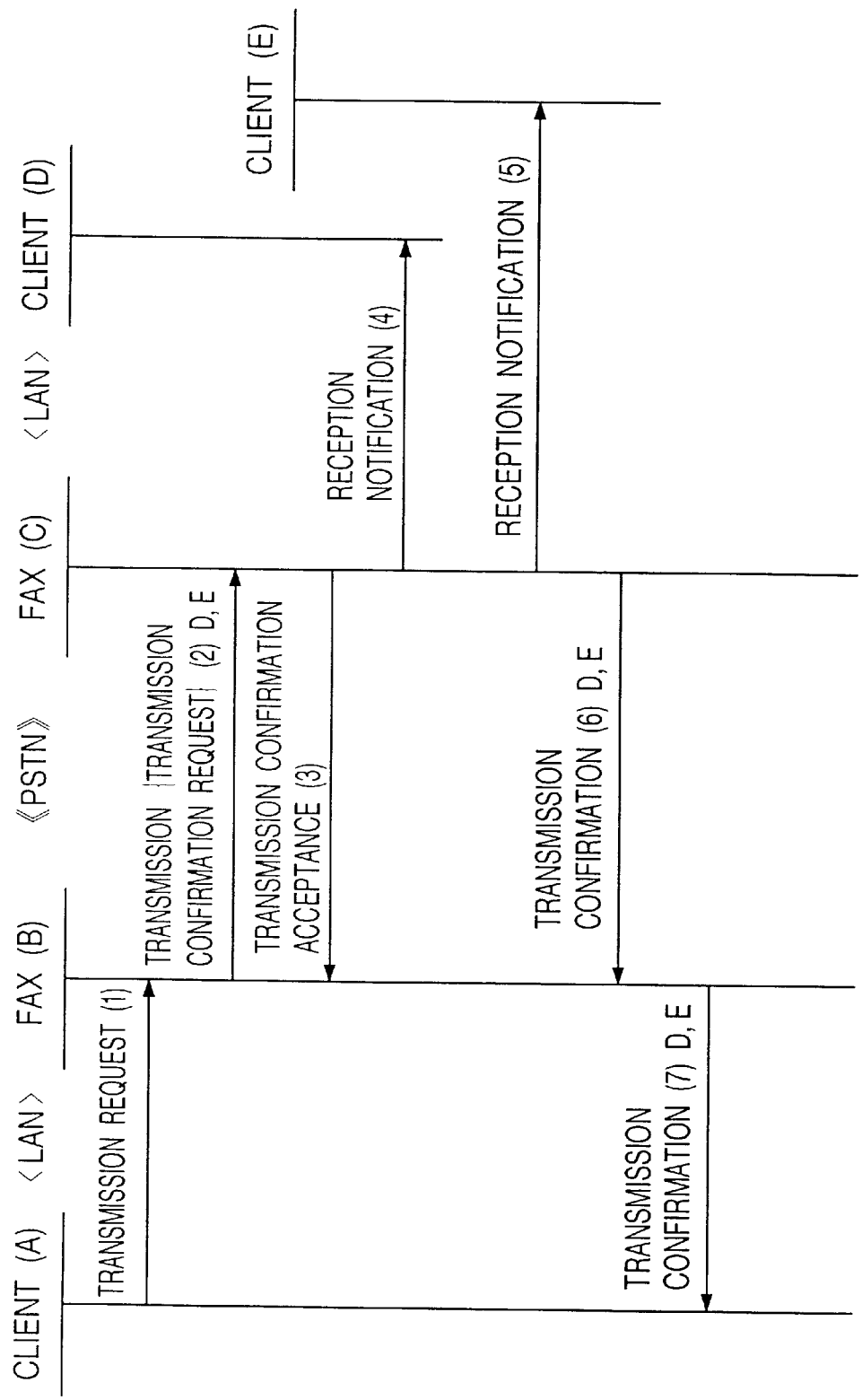
FIG. 5 is a view illustrating a sequence flow in a case where transmission confirmations to a plurality of clients are transmitted to a transmission side at a time.

It will be then explained a case where the transmission confirmations for the plurality of clients are returned to the transmission side at a time. FIG. 5 is a view showing a sequence flow in such the case.

In FIG. 5, the operations until the facsimile apparatus (C) returns to the facsimile apparatus (B) the signal representing the transmission confirmation acceptance (3) and releases the line after the data reception terminates (the operation including to store various information into the RAM 103) are the same as those shown in FIG. 4. Therefore, the detailed explanation thereof is omitted.

Thereafter, the facsimile apparatus (C) performs the reception notification (4) to the client (D) which is one of the reception destination clients on the LAN 2. Subsequently, the facsimile apparatus (C) performs the reception notification (5) to the client (E) which is the other of the reception destination clients on the LAN 2.

After the reception notifications to the clients (D) and (E) terminate, the facsimile apparatus (C) generates a call on the basis of the telephone number of the facsimile apparatus (B), and transmits to the facsimile apparatus (B) the signal representing the transmission confirmation (6) for the clients (D) and (E) together with the information designating the client (A). Then, the facsimile apparatus (C) releases the line after the transmission terminates.

Thereafter, the facsimile apparatus (B) receives the above transmission confirmation (6) and then transmits to the transmission indication source, i.e., the client (A), the signal representing the transmission confirmation (7), to notify to the client (A) that the reception notifications were performed to the clients (D) and (E).

According to such a method as described above, the transmission side can receive the transmission confirmations concerning the plurality of reception destination clients at a time. Thereafter, the process at the side which returns the transmission confirmation can be simplified, and a call charge can be restrained to that corresponding to one-time call. Further, the side which receives the transmission confirmation can receive the transmission confirmations of all of the destination clients at a time, so that management of these transmission confirmation becomes easy.

Figure 6:
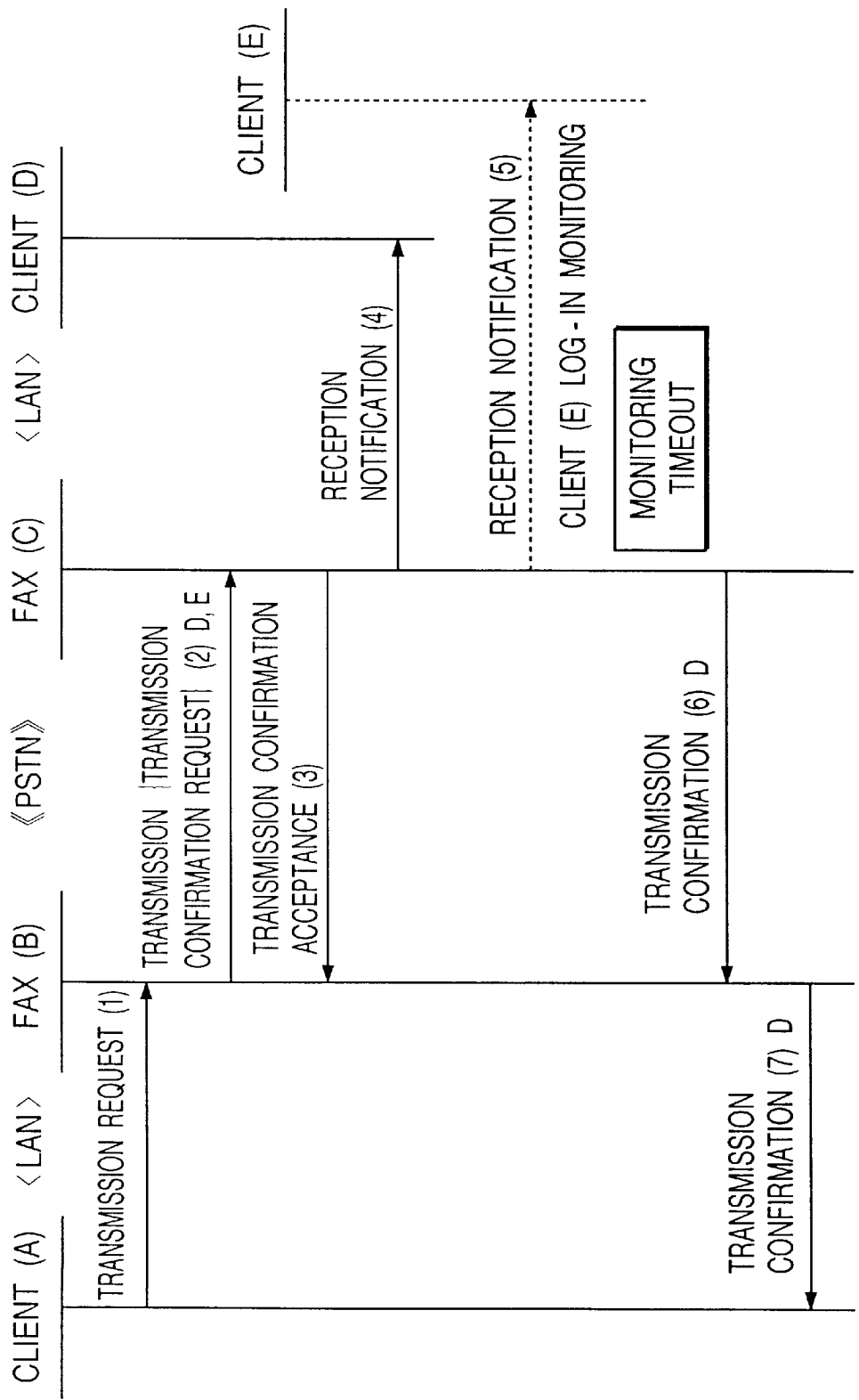
FIG. 6 is a view illustrating a sequence flow in a case where a reception notification cannot be performed to a part of clients in the case of FIG. 5.

FIG. 6 is a view showing a sequence flow in a case where the reception notification cannot be performed for a part of the reception destination clients in the case shown in FIG. 5.

In FIG. 6, the processes until the facsimile apparatus (C) returns the signal representing the transmission confirmation acceptance (3) to the facsimile apparatus (B) and releases the line after the data reception terminates (the operation including to store various information into the RAM 103) are the same as those shown in FIG. 4. Therefore, the detailed explanation thereof is omitted.

Thereafter, the facsimile apparatus (C) performs the reception notification (4) to the client (D) which is one of the reception destination clients on the LAN 2.

Subsequently, the facsimile apparatus (C) attempts to perform the reception notification (5) to the client (E) which is the other of the reception destination clients on the LAN 2. However, it is assumed in this case that such the reception notification cannot be performed because the client (E) is not logged in the LAN 2 (including a case where a power is down). Therefore, the facsimile apparatus (C) observes a log-in state of the client (E). Then, if the client (E) comes to be in the normal log-in state within a predetermined period of time, the facsimile apparatus (C) performs the reception notification. However, if not, the facsimile apparatus (C) stops the reception notification (5) to the client (E). In this case, it is assumed that the facsimile apparatus (C) is not logged in within the predetermined period of time.

If so, the facsimile apparatus (C) generates a call on the basis of the telephone number of the facsimile apparatus (B) in a state that only the reception notification to the client (D) terminated, and transmits to the facsimile apparatus (B) the signal representing only the transmission confirmation (6) together with the information designating the client (A).

Then, the facsimile apparatus (B) receives the above transmission confirmation, and transmits the signal representing the transmission confirmation (7) to the transmission indication source, i.e., the client (A), so as to notify that the reception notification to the client (D) is performed. After the reception notification to the client (E) terminates, the facsimile apparatus (C) again generates a call to transmit to the facsimile apparatus (B) the transmission confirmation concerning the client (E) or notify to the facsimile apparatus (B) that the reception notification to the client (E) could not be performed.

According to such a method as described above, a time until the transmission confirmation is returned to the transmission side can be shortened.

FIGS. 7A to 7E respectively show parts of information which are managed in the RAM 103 of the facsimile apparatus of the reception side.

Figure 7A:
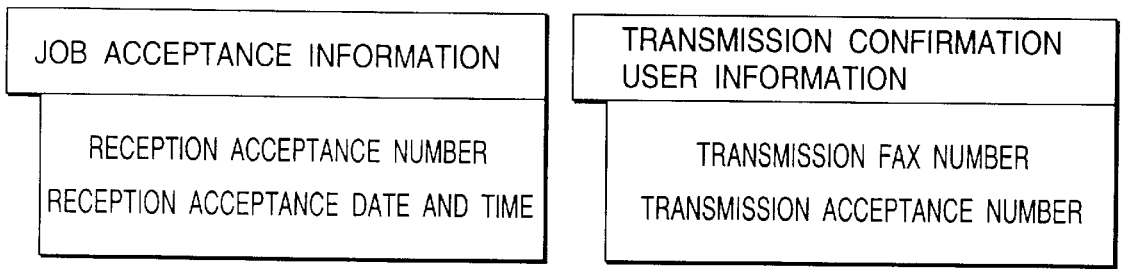
FIGS. 7A to 7E are views illustrating a part of management data which are managed in a RAM 103 by a facsimile apparatus of a reception side.

FIG. 7A shows job acceptance information in which a number to be allocated to a job accepted at the reception acceptance and a time (i.e., year, month, date, time, minute and second) at the reception acceptance are stored.

Figure 7B:
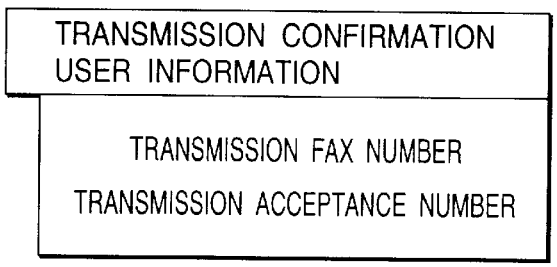

FIG. 7B shows transmission confirmation user information in which the telephone number of the transmission-side facsimile apparatus transmitted from the transmission side and the single job number allocated to the transmission job (transmission data) transmitted from the transmission side are stored.

Figure 7C:
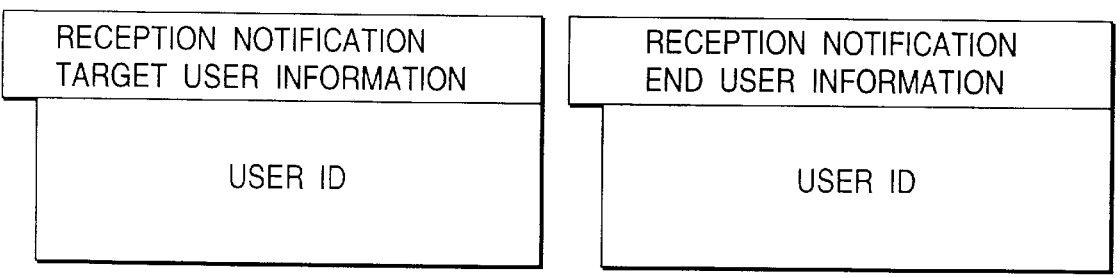

FIG. 7C shows reception notification target user information in which a user identification (ID) of the client on the reception-side LAN to which the reception notification should be performed is stored. The ID is transmitted from the transmission side.

Figure 7D:
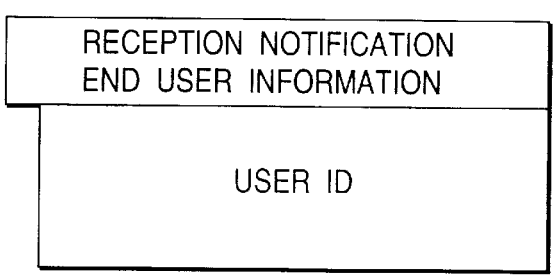

FIG. 7D shows reception notification end user information in which the user ID of the client to which the reception notification has been performed is stored.

Figure 7E:
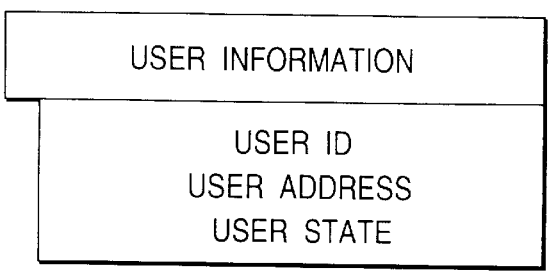

FIG. 7E shows user information in which various information concerning all of the clients to which the facsimile apparatus is connected are stored with correlating them to the respective clients. In this case, such the various information include the user IDs, user addresses, information as to whether or not the clients are logged in.

FIG. 8 is a flow chart showing a process flow concerning the data reception by the facsimile apparatus of the reception side.

Initially, the facsimile apparatus receives the call from the transmission side. When the line connection is established, the facsimile number and the transmission job number of the transmission side are received as transmitter information from the transmission side (step S801). Then, it is judged based on the transmitter information whether or not the transmission side is a transmitter from which reception should permitted (step S802). Such a judgment is performed by previously registering the transmitter from which reception should be permitted, or contrary by previously registering the transmitter from which reception should be refused. If permitting the reception, the transmitter information (i.e., facsimile number, transmission acceptance number) is stored as management data in the transmission confirmation user information area in the RAM 103 (step S803). On the other hand, if refusing the reception, the flow terminates as error end.

Subsequently, the user ID of the client to which reception notification should be performed is received from the transmission-side facsimile apparatus, together with the reception notification request and the transmission confirmation request (step S804). At this time, if the plurality of clients are being designated, the user IDs corresponding to the plurality of clients are received. Then, it is judged whether or not the users (i.e., clients) corresponding to the designated user IDs exist in a management user data list of the reception-side facsimile apparatus (step S805). If all the users exist in the list, the user IDs are stored in the reception notification target user information area in the RAM 103, as management data (step S806). On the other hand, if all the users do not exist in the list, the flow terminates as error end. Further, if parts of the users do not exist, such a fact may be notified to the transmission side or to the user of the reception side with outputting a report by the printer 115.

After registering the user IDs, the image data is received (step S807), and it is judged whether or not the received data includes an error (step S808). If the received data does not include the error, at least one reception acceptance number and one reception acceptance data and time on this day are stored in the job acceptance information area in the RAM 103, as the management data (step S809), and the reception acceptance number is transmitted to the transmission side (step S810). On the other hand, if the received data includes the error, the flow terminates as error end.

In the user information of the management data, the user ID is registered by the operator such as a manager. When, the user logs in (i.e., performing log-in operation), the information (i.e., address and ID) representing which client machine on the LAN is logged in is registered with correlating it to the corresponding user ID in the user information of the management data. The user can perform log in variously from the plurality of client machines on the LAN. In this case, the plurality of address information and the like are correlated to the user IDs and registered in the user information of the management data.

Figure 9:
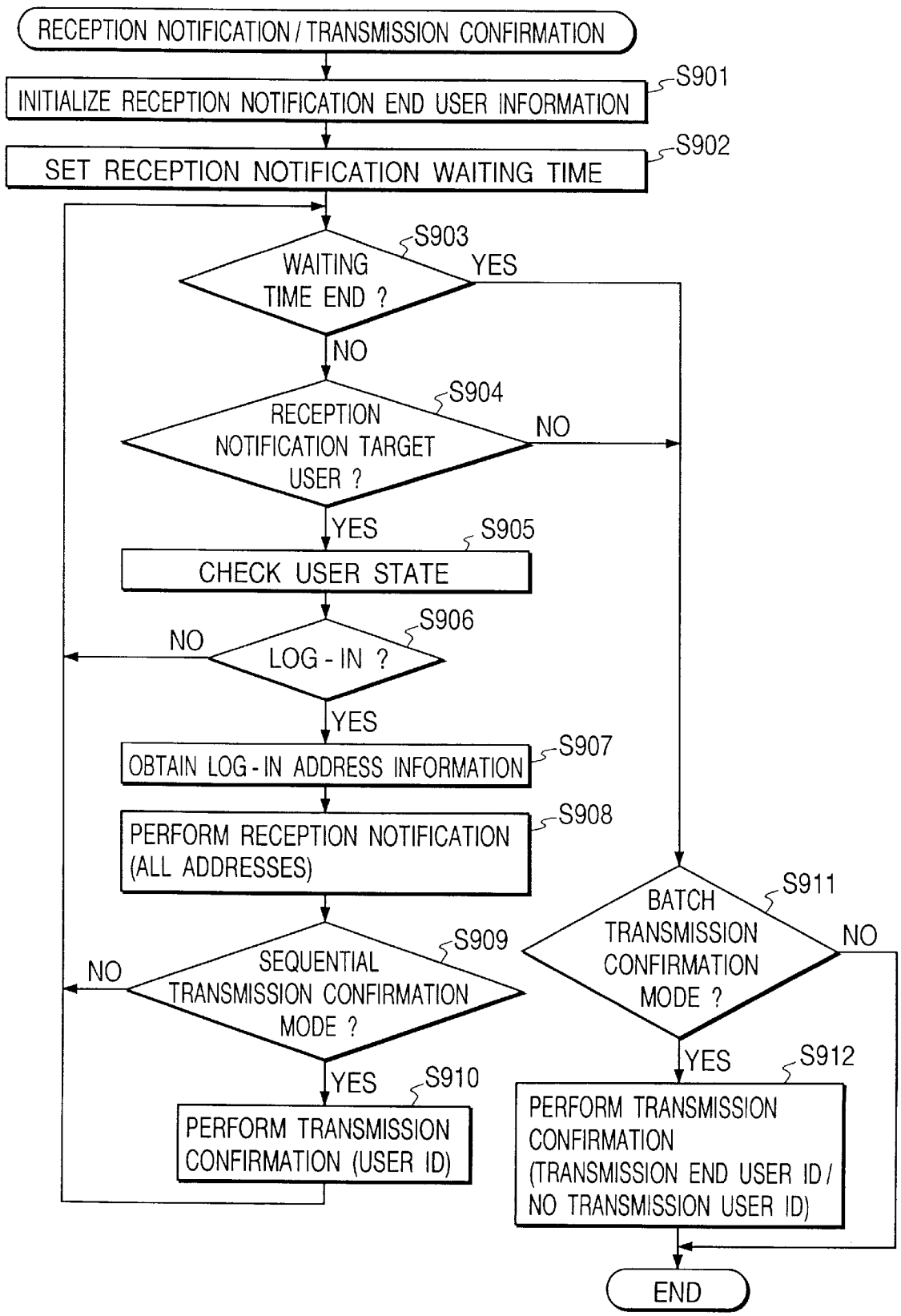
FIG. 9 is a flow chart illustrating a process flow concerning the reception notification and the transmission confirmation in the facsimile apparatus of the reception side.

FIG. 9 is a flow chart showing a process flow concerning the reception notification and the transmission confirmation at the reception-side facsimile apparatus.

Initially, in the management data stored in the RAM 103, the reception notification end user information area is initialized (step S901). Then, in a case where the reception notification is performed for the data received in such a manner as shown in FIG. 8, if such the reception notification can be performed within a predetermined period of time, the reception notification is actually performed. In this case, it is stored a time obtained by adding such a reception notification waiting time to the reception acceptance date and time stored in the RAM 103 (step S902). In a step S903, it is judged whether or not the stored time is elapsed. If not, the flow advances to a step S904 to judge whether or not the user ID has been set in the reception notification target user information in the RAM 103. If the user ID has been set, the user information corresponding to such the user ID is checked in the RAM 103 (step S905). Then, it is judged based on this user information whether or not the target user is in the log-in state (step S906). If in the log-in state, the address information of all of the target clients in the log-in state are fetched or obtained (step S907). On the other hand, if not in the log-in state, the flow returns to the step S903 to repeat the process. Subsequently, in a step S908, the reception notification is performed to the clients at the fetched addresses. At this time, the reception information such as the information of transmission source (i.e., transmission facsimile number, transmission acceptance number, identification information of transmission-requesting client and the like), a reception time, the number of pages of the received image is simultaneously notified.

Thereafter, the designated transmission confirmation mode is checked. Such a mode designation may be performed previously by the reception side or may be performed according to the request of the transmission side. In a step S909, if it is judged that a sequential transmission confirmation mode (i.e., a manner such as shown in FIG. 4) is being set, the flow advances to a step S910, so as to return the user ID of the client to which the reception notification has been performed, to the transmission source as the transmission confirmation. Then, the flow returns to the step S903 to repeat the process until the waiting time terminates or until the reception notification is performed to all of the reception notification target users and thus there is no target user.

If the waiting time terminates in the step S903, or if it is judged in the step S904 there is no target user to which the reception notification is not yet performed, the flow advances to a step S911 to check a transmission confirmation mode. If judged as a batch transmission confirmation mode (i.e., a manner such as shown in FIGS. 5 and 6), the flow advances to a step S912 to return to the transmission side the transmission confirmations of all of the reception destination clients by utilizing the user IDs of the reception notification end users (i.e., user to which the reception notification is completed) and the user IDs of the no reception notification users (i.e., users to which the reception notification is not yet performed). On the other hand, if judged as the sequential transmission confirmation mode, the flow directly terminates.

As described above, according to the present embodiment, in the case where the transmission side transmits the data with designating the reception user, the reception to such the user can be surely notified to the transmission side. Further, in the case where the designated user does not exist on the LAN, it can be notified to the transmission side that the reception notification could not be performed.

In the above explanation, in the case where the transmission confirmation request is performed from the transmission side, the transmission confirmation notification is performed to the transmission side by the call re-generation of the reception side. Hereinafter, it will be explained a method for determining whether the transmission confirmation is performed by the call generation from the transmission side or from the reception side on the basis of negotiation between the transmission side and the reception side, and a method for performing the transmission confirmation notification in accordance with the call re-generation from the transmission side.

Figure 10:
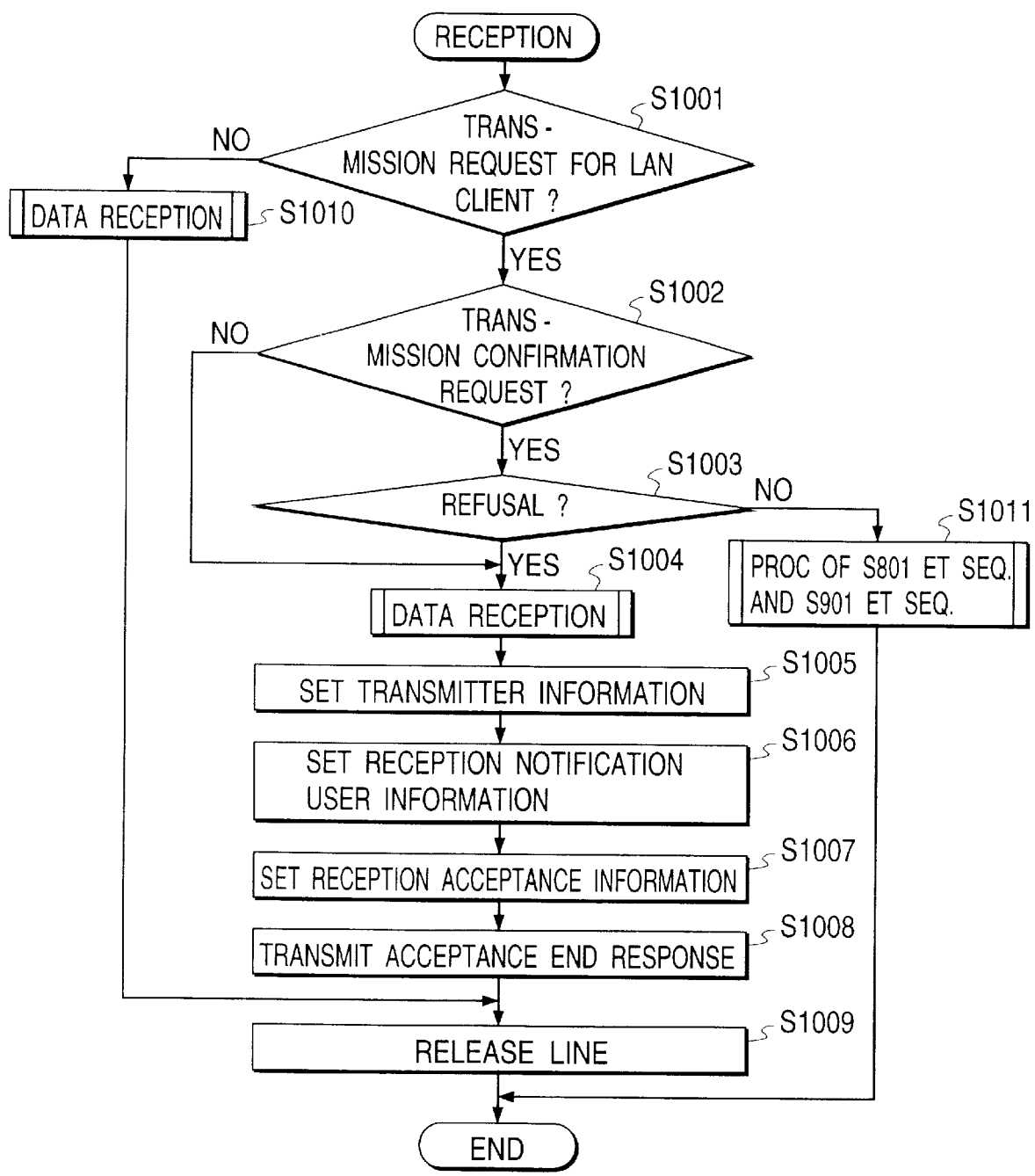
FIG. 10 is a flow chart illustrating a process flow concerning the data reception by the facsimile apparatus of the reception side.
Figure 11:
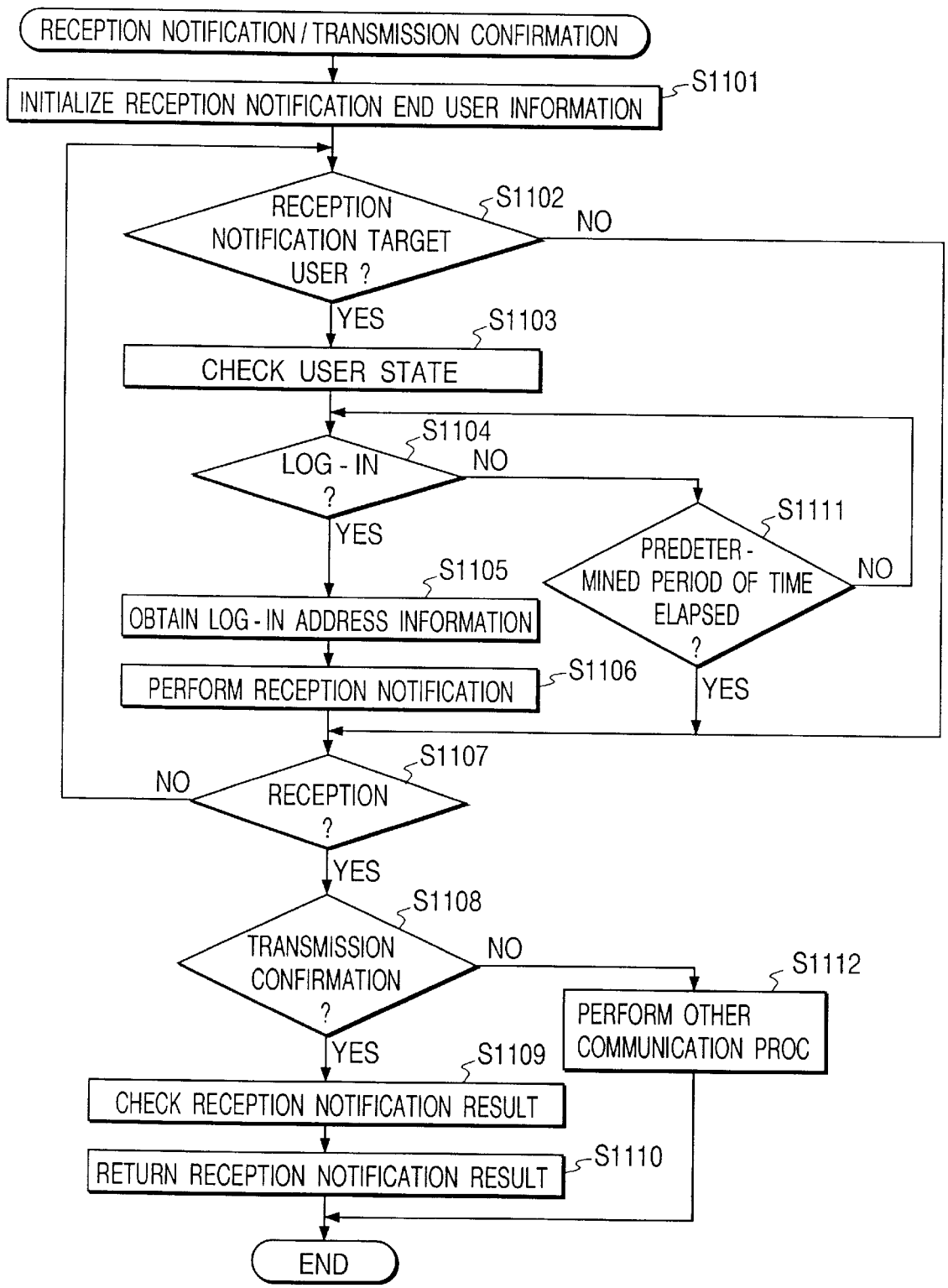
FIG. 11 is a flow chart illustrating a process flow concerning the reception notification and the transmission confirmation in the facsimile apparatus of the reception side.

FIGS. 10 and 11 are flow charts showing process flows in such cases.

Initially, the call generated from the transmission side is received. Then, if the line connection is established, it is judged responsive to an NSS signal based on CCITT Recommendation T.30 whether or not the data transmission to the client on the LAN is requested (step S1001). If judged that the data transmission is not requested, the flow advances to a step S1010 to perform the facsimile reception under an ordinary G3 mode in accordance with a CCITT Recommendation T.30 procedure. On the other hand, if judged that the data transmission is requested, the flow advances to a step S1002 to judge whether or not there is the transmission confirmation request, i.e., there is the transmission confirmation notification request by the call re-generation from the reception side. In a step S1003, if it is being set to refuse the transmission confirmation notification by the call re-generation from the reception side, such a fact is notified to the transmission side, and the data reception is performed in a step S1004. Such the data includes the information necessary for the data confirmation, document data (image data) and the like. On the other hand, if it is being set not to refuse the transmission confirmation notification, the flow advances to a step S1011 to perform such the processes as shown in FIGS. 8 and 9.

In a step S1005, the transmitter information (i.e., telephone number of transmitter, transmission acceptance number and the like) included in the data transmitted from the reception side is stored in the transmission confirmation user information area in the RAM 103. In a step S1006, the user ID of the reception notification user designated from the transmission side is stored in the reception notification target user information area in the RAM 103. In a step S1007, the reception acceptance information such as at least one reception acceptance number, one reception acceptance date and time or the like on this day is stored in the job acceptance information area in the RAM 103. Then, in a step S1008, the reception acceptance number is transmitted to the transmission side. After the above process terminates, the line is released in a step S1009.

Subsequently, it will be explained the processes concerning the reception notification and the transmission confirmation by the reception-side facsimile apparatus.

Initially, the reception notification end user information area in the management data stored in the RAM 103 is initialized (step S1101).

Then, in a step S1102, it is judged whether or not the user ID is being set in the reception notification target user information area in the RAM 103. If the user ID is being set, the user information corresponding to the such the user ID is checked in the RAM 103 (step S1103). In a step S1104, it is judged from the user information whether or not the target user is in the log-in state. If judged to be in the log-in state, the address information of all of the target clients who have logged in are fetched and obtained (step S1105). Subsequently, in a step S1106, the reception notification is performed to the client machines at the fetched addresses. Simultaneously, the information of the transmission source (i.e., transmission facsimile number, transmission acceptance number, identification information of transmission requesting client and the like), and the reception information such as the reception time and the number of pages of the reception image are notified. Further, a down loading of the reception image is performed according to the setting contents.

On the other hand, if judged not to be in the log-in state, it is waited until a predetermined period of time is elapsed (step S1111), and then the flow advances to a step S1107.

In the step S1107, it is judged whether or not there is the reception. If there is the reception, the flow advances to a step S1108 to judge whether or not the reception is the transmission confirmation from the transmission side. If the reception is the transmission confirmation, the flow advances to a step S1109 to check a reception notification result by referring the management data in the RAM 103. Namely, it is checked the information whether or not the reception notification could be performed and the information whether or not the designated client exists. In a step S1110, such the reception notification result is transmitted to the transmission side in accordance with the request from the transmission side. In this case, the request from the transmission side is the transmission confirmation request based on the transmission acceptance number and the user ID of the client. Then, if the process terminates as a whole, the line is disconnected.

As described above, the transmission confirmation can be performed also by the call re-generation of the transmission side, if necessary.

Further, the time of the transmission confirmation may be previously determined according to the negotiation or the like.

Furthermore, in the above description, the facsimile apparatus can be connected directly to the LAN. However, the present embodiment is not limited to such a structure. That is, in the present embodiment, a facsimile server or the like for controlling the facsimile apparatus and managing the LAN may be provided between the facsimile apparatus and the LAN. Moreover, the present embodiment can be similarly applied to either a wire communication and a wireless communication.

As explained above, according to the present embodiment, it can be effectively notified to the transmission side whether or not the data reception was notified to the terminal on the LAN.

In the present embodiment, the flow charts shown in FIGS. 8 to 11 respectively show the control procedure which is performed by the CPU 101 on the basis of the program stored in the ROM 102. However, program data for performing the same procedure may be installed in the hard disk or the like in the server machine 202, so as to cause a microprocessor of the server machine 202 to perform the process other than the communication controlling.

The present invention is applicable to a system constructed by a plurality of equipments (e.g., host computer, interface equipment, reader, printer or the like) or is also applicable to an apparatus comprising one equipment (e.g., copying machine or facsimile machine).

An invention embodied by a method whereby program codes of a software to realize the functions of the embodiment are supplied to a computer in an apparatus or system connected to various devices so as to make the devices operative in order to realize the functions of the foregoing embodiments and the various devices are operated in accordance with the programs stored in the computer (CPU or MPU) of the system or apparatus is also included in the scope of the present invention.

In such a case, the program codes themselves of the software realize the functions of the foregoing embodiments and the program codes themselves and means for supplying the program codes to the computer, for example, a memory medium in which the program codes have been stored construct the present invention.

As such a memory medium to store the program codes, for example, it is possible to use a floppy disk, a hard disk, and optical disk, an optomagnetic disk, a CD-ROM, a magnetic tape, a non-volatile memory card, an ROM, or the like can be used.

It will be obviously understood that the program codes are included in the embodiments of the present invention even in not only a case where the functions of the foregoing embodiments are realized by executing the supplied program codes by the computer but also a case where the functions of the foregoing embodiments are realized in cooperation with the OS (operating system) by which the program codes operate in the computer or another application software or the like.

Further, it will be also obviously understood that the present invention also incorporates a case where the supplied program codes are stored into a memory provided for a function expansion board of a computer or a function expansion unit connected to a computer and, after that, a CPU or the like provided for the function expansion board or function expansion unit executes a part or all of the actual processes on the basis of instructions of the program codes, and the functions of the foregoing embodiments are realized by the processes.

Although the present invention has been described above with respect to the preferred embodiments, the present invention is not limited to the foregoing embodiments but many modifications and variations are possible within the spirit and scope of the appended claims of the present invention.

What is claimed is:

1. A data processing apparatus which performs a data process via a local area network (LAN) and a communication line other than the LAN, comprising:

reception means for receiving a data designated to a plurality of receivers, from a transmission side via the communication line;

notification means for notifying the plurality of receivers on the LAN that said reception means received the data;

transmission means for transmitting information representing a notification result by said notification means, to the transmission side from which the data received by said reception means was transmitted via the communication line;

setting means for setting a time to permit a transmission of the information representing the notification result by said notification means;

determining means for determining whether or not the time set by said setting means has been reached; and control means for causing said transmission means to transmit the information representing the notification result by said notification means via the communication line, in a case where said determining means determines that the time set by said setting means has been reached, wherein said control means causes said transmission means to transmit the information concerning receivers to which the notification by said notification means was successful among the plurality of receivers designated by the transmission side until it is determined by said determining means that the time set by said setting means has been reached.

2. An apparatus according to claim 1, wherein, if there is the receiver to which the notification could not be performed by said notification means until it is determined by said determining means that the time set by said setting means has been reached, said transmission means transmits information representing such a fact.

3. An apparatus according to claim 1, wherein a case where the notification by said notification means succeeded is a state where the receiver can obtain the data.

4. A control method of a data processing apparatus which performs a data process via a local area network (LAN) and a communication line other than the LAN, said method comprising:

a reception step of receiving data designated to a plurality of receivers, from a transmission side via the communication line;

a notification step of notifying the plurality of receivers on the LAN that the data is received in said reception step;

a transmission step of a transmitting information representing a notification result in said notification step, to the transmission side from which the data received in said reception step was transmitted via the communication line;

a setting step of setting a time to permit a transmission of the information representing the notification result in said notification step;

a determining step of determining whether or not the time set in said setting step has been reached; and a control step of causing said transmission step to transmit the information representing the notification result in said notification step via the communication line, in a case where said determining step determines that the time set in said setting step has been reached, wherein said control step causes said transmission step to transmit the information concerning receivers to which the notification in said notification step was successful among the plurality of receivers designated by the transmission side until it is determined in said determining step that the time set in said setting step has been reached.

5. A computer-readable program to be used by data processing apparatus which performs a data processing via a local area network (LAN) and a communication line other than the LAN, said apparatus comprising:

reception means for receiving data designated to a plurality of receivers, from a transmission side via the communication line;

notification means for notifying the plurality of receivers on the LAN that said reception means received the data;

transmission means for transmitting information representing a notification result by said notification means, to the transmission side from which the data received by said reception means was transmitted via the communication line;

setting means for setting a time to permit a transmission of the information representing the notification result by said notification means;

determining means for determining whether or not the time set by said setting means has been reached; and control means for causing said transmission means to transmit the information representing the notification result by said notification means via the communication line, in a case where said determining means determines that the time set by said setting means has been reached, wherein said control means causes said transmission means to transmit the information concerning receivers to which the notification by said notification means was successful among the plurality of receivers designated by the transmission side until it is determined by said determining means that the time set by said setting means has been reached.

* * * * *

UNITED STATES PATENT AND TRADEMARK OFFICE
CERTIFICATE OF CORRECTION

PATENT NO. : 6,163,800
DATED : December 19, 2000
INVENTOR(S) : Sheisi Ejiri

It is certified that error appears in the above-identified patent and that said Letters Patent is hereby corrected as shown below:

<u>Title page,</u>
Item [75], Inventor, "Seishi Ejiri" should read -- Sheisi Ejiri --

Signed and Sealed this

Tenth Day of December, 2002

JAMES E. ROGAN
*Director of the United States Patent and Trademark Office*